Sept. 1, 1964 K. N. BROWN 3,147,073
PROCESS FOR PREPARING MOLTEN SILVER CHLORIDE BY THE CONTROLLED
REACTION OF CHLORINE ON CHARGE OF METALLIC SILVER
Filed June 21, 1962
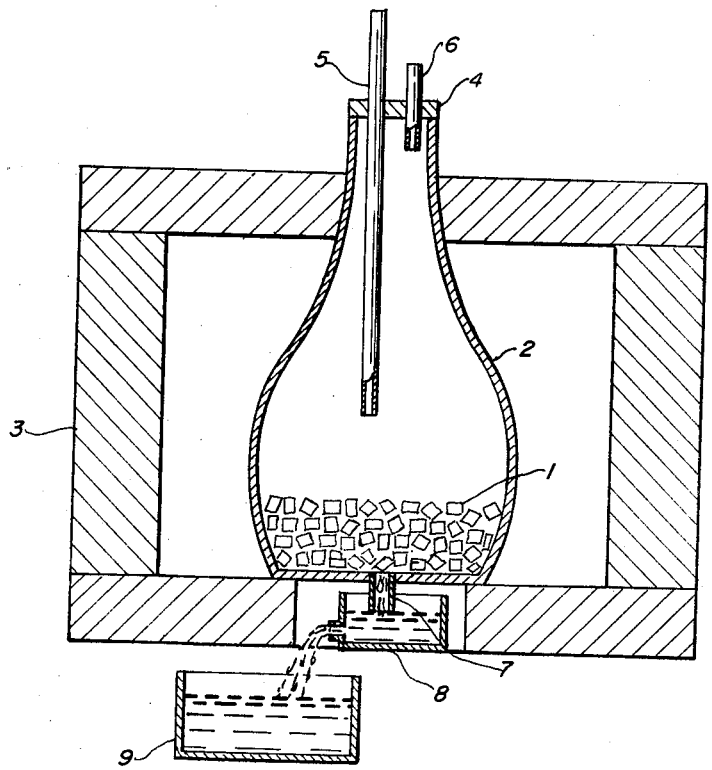
INVENTOR.
KENNETH N. BROWN
BY Irving Holtzman
ATTORNEY.

United States Patent Office 3,147,073
Patented Sept. 1, 1964

3,147,073
PROCESS FOR PREPARING MOLTEN SILVER CHLORIDE BY THE CONTROLLED REACTION OF CHLORINE ON CHARGE OF METALLIC SILVER
Kenneth N. Brown, Teaneck, N.J., assignor to Yardney International Corp., New York, N.Y., a corporation of New York
Filed June 21, 1962, Ser. No. 204,157
5 Claims. (Cl. 23—87)

The present invention relates to a novel method for the production of metal halides and particularly of silver chloride.

Heretofore, silver chloride was manufactured commercially by dissolving silver or silver-containing scrap in nitric acid, precipitating the chloride with sodium chloride or hydrochloric acid, and washing and drying the product. In addition, it was necessary to melt the product and to cast it, if a cast ingot was required, for rolling the silver chloride into a sheet.

There are some teachings in the prior art to the effect that chlorine gas reacts with silver slowly at room temperature and more rapidly at elevated temperatures. However, upon trying to produce silver chloride at room temperature and at 500° F., it was found that in the first instance only a tarnish was produced after 1 hour while in the second instance only 0.6 gr. silver chloride was produced upon 24 in.$^2$ of surface after 1 hour. In both cases, the film of chloride was very tenacious and served to protect the underlying metal from further attack. Undoubtedly, longer exposure of the metal to the chlorine atmosphere would cause more chloride to form but the rate would be extremely slow since the gas would have to diffuse through the layer of silver chloride. It is quite evident that at temperatures under the melting point of silver chloride the production rate is not practical.

It has now been found that metal halides and particularly non-volatile metal halides such as silver chloride may be economically and conveniently made by direct reaction of the metal and the halogen at a temperature which is above the melting point of a metal halide recoverable as a reaction product and below the melting point of a corresponding metal reactant. As used herein, the term non-volatile metal halides is used to define metal halides that are not volatile at temperatures that may be reached in ordinary electric or gas furnaces.

It is accordingly an object of this invention to provide a process for producing a metal halide, e.g. silver chloride, by the direct combination of the metal, e.g. silver, and the halogen, e.g. chlorine gas.

A further object of this invention is to reduce production costs in the manufacture of metal halides by eliminating most of the processing steps, by reducing the labor and chemical costs, and by the use of less expensive equipment.

Other and more detailed objects of this invention will be apparent from the following description and the accompanying drawing whose sole figure is a cross-sectional view of a device useful for carrying out the process of the present invention.

Although this invention has application to the production of any metal halide, and particularly to those metal halides that have a melting point that is lower than the melting point of the metal from which they are prepared, it will be specifically described with reference to silver chloride.

The objects of this invention are achieved by heating silver metal in a heating chamber to a temperature above the melting point of silver chloride (455° C.), and then admitting chlorine gas into said chamber. Silver chloride forms instantly in the liquid state, runs off the silver metal, and collects in the bottom of the heating chamber. Fresh unreacted silver metal is thus available for further reaction with chlorine gas. The rate of production of silver chloride is controlled by the temperature of the metal, the surface area of the metal charge, and the pressure and the rate of flow of the chlorine. Since the reaction is exothermic, the silver will melt unless the variables are controlled. It is preferable not to allow the silver to melt since doing so complicates the process. Allowing molten silver to mix with the molten silver chloride constituting the reaction product, or permitting the molten silver chloride to cover up the metal, brings the silver out of contact with chlorine gas. To the extent that this happens, the reaction may be incomplete.

It is desirable to control the production rate by controlling the rate of the flow of the chlorine. The rate at which the chlorine is fed into the reaction chamber may be varied and is related to the surface area of the silver charge. In general, however, the chlorine gas will be charged into the reaction chamber at atmospheric pressure at the rate of $\frac{1}{200}$ of a pound to $\frac{1}{20}$ of a pound per minute per square inch of metallic silver surface. When this is done at atmospheric pressure, the process runs smoothly and there are no chlorine leaks. However, with the proper equipment, the reaction may be carried out at elevated pressures.

Provisions are made in the heating chamber that permit the molten chloride to flow out of the vessel and into a mold without allowing gas to escape into the atmosphere.

It will be seen that this is a one-step process in which the reaction product may be cast as it is made. It will also be seen that there are substantial savings in chemicals and labor. Only chlorine gas is used in slight excess whereas in previous methods a substantial excess of nitric acid is required plus sufficient sodium chloride or hydrochloric acid. The labor required by the invention is only to charge the furnace as compared with the lengthy steps indicated earlier.

The figure of the drawing shows a preferred embodiment of this invention in diagrammatic form. The charge of silver metal 1 is placed in the reaction chamber 2 which is disposed in the furnace 3. The cap 4, containing an inlet tube 5 and an outlet tube 6, is cemented to the reaction chamber 2. The furnace is heated until the temperature of the charge exceeds the melting point of silver chloride (455° C.), but not the melting point of the metallic silver. A thermocouple (not shown) may be introduced into the chamber to indicate the temperature of the charge. Chlorine gas is admitted by the inlet tube 5 and its rate of flow may be controlled by a thermocouple-and-mechanized valve arrangement (not shown). This chlorine displaces the air in the reaction chamber and escapes through the outlet tube 6. Essentially all of the chlorine is consumed by the reaction, very little escaping through the outlet. The molten chloride drops to the bottom of the vessel and flows through the tube 7 into a liquid seal 8 whence it overflows into the mold 9. The mold 9 may be substituted by a holding furnace or a system for making powder by atomization of molten metal coming from reaction chamber 2 without departing from the spirit of this invention.

The charge 1 may be ingot, strip, sheet, foil, or other solid silver metal. The use of powder or scrap metal is also contemplated by the present invention, yet such use may introduce difficulties in that the former is liable to overheat without special control, while the latter will require washing out the impurities. With the necessary controls, because of the rapid rate of reaction, silver powder can be utilized.

The reaction chamber 2 may be a crucible, retort, or other vessel of inert material such as graphite, silicon carbide, magnesia, alumina, silica, or other refractory. The furnace 3 may be heated electrically or with gas or oil and the hole in the bottom should also be heated to prevent freeze-up of the tube and the liquid seal.

The following example is further illustrative of the present invention:

*Example*

Using the apparatus shown in the figure of the drawing, a charge of silver strip, weighing 5 pounds and having a surface area of about 20 sq. in., was placed inside of reaction chamber 2. Furnace 3 was heated and maintained at a temperature of about 1,300° F. Chlorine gas, slightly above atmospheric pressure, was introduced into the reaction chamber 2 through inlet tube 1 at the rate of about .54 lb. per minute. This resulted in the production of silver chloride at the rate of about 2 lbs. per 15 minutes.

Whereas the invention has been described with reference to specific forms thereof, it will be understood that many changes and modifications may be made without departing from the spirit and scope of the appended claims.

What is claimed is:

1. A process for preparing silver chloride which comprises introducing a charge of metallic silver into a reaction chamber, heating said reaction chamber to a temperature above the melting point of silver chloride but below the melting point of silver, continuously introducing chlorine gas at a location above said charge into said reaction chamber, and continuously withdrawing resulting molten silver chloride from said reaction chamber at a location below said charge.

2. A process according to claim 1 wherein the molten silver chloride withdrawn from the reaction chamber is cast molded immediately upon its withdrawal.

3. A process for preparing silver chloride which comprises introducing a charge of metallic silver into a reaction chamber, heating said reaction chamber to a temperature above the melting point of silver chloride but below the melting point of silver, continuously introducing chlorine gas at a location above said charge into said reaction chamber, continuously withdrawing resulting molten silver chloride from said reaction chamber at a location below said charge, and stabilizing the exothermic reaction between silver and chlorine gas by controlling the admission rate of said gas into said chamber in dependence upon the prevailing temperature therein.

4. A process for preparing silver chloride which comprises depositing on the bottom of a reaction vessel a charge consisting of lumps of metallic silver, heating said vessel to a temperature above the melting point of silver chloride but below the melting point of silver, continuously introducing chlorine gas at a location above said charge into said vessel, and continuously withdrawing resulting molten silver chloride from said vessel at a location underneath said charge.

5. A process for preparing silver chloride which comprises depositing on the bottom of a reaction vessel a charge consisting of metallic silver, heating said vessel to a temperature above the melting point of silver chloride but below the melting point of silver, continuously introducing chlorine gas at a location above said charge into said vessel, continuously withdrawing resulting molten silver chloride from said vessel at a location underneath said charge, stabilizing the exothermic reaction between silver and chlorine gas by controlling the admission rate of said gas into said vessel in dependence upon the prevailing temperature therein, and removing unreacted gas upwardly from said vessel.

References Cited in the file of this patent

UNITED STATES PATENTS

| | | |
|---|---|---|
| 523,715 | Sommer | July 31, 1894 |
| 2,670,270 | Jordan | Feb. 23, 1954 |
| 2,715,565 | McKay | Aug. 16, 1955 |
| 2,767,052 | Harner et al. | Oct. 16, 1956 |
| 2,868,621 | Giraitis | Jan. 13, 1959 |
| 2,877,495 | Wegener et al. | Mar. 17, 1959 |
| 2,916,351 | Hansley et al. | Dec. 8, 1959 |
| 2,946,668 | Richelsen | July 26, 1960 |
| 2,955,931 | Flores et al. | Oct. 11, 1960 |
| 3,056,185 | Langhans | Oct. 2, 1962 |

FOREIGN PATENTS

| | | |
|---|---|---|
| 680,710 | Great Britain | Oct. 8, 1952 |

OTHER REFERENCES

Jacobson: Encyclopedia of Chemical Reactions, vol. 6, page 143 (1956), Reinhold Publ. Cor., New York, N.Y.